United States Patent [19]
Giannetti

[11] Patent Number: 5,992,199
[45] Date of Patent: Nov. 30, 1999

[54] MODULAR KNURLING TOOL

[76] Inventor: Enrico R. Giannetti, P.O. Box 770785, Houston, Tex. 77215

[21] Appl. No.: 09/042,335

[22] Filed: Mar. 13, 1998

[51] Int. Cl.⁶ .................................................. B21D 15/00
[52] U.S. Cl. ................................. 72/108; 72/104; 72/703
[58] Field of Search ............................ 72/103, 104, 108, 72/703; 407/76, 88; 408/147, 153, 181, 185

[56] References Cited

U.S. PATENT DOCUMENTS

| | | | |
|---|---|---|---|
| 2,474,907 | 7/1949 | Mercep | 407/88 |
| 3,801,213 | 4/1974 | Eversole | 408/181 |
| 3,972,212 | 8/1976 | Brinkman | 72/703 |
| 4,080,854 | 3/1978 | Peterson | 407/88 |
| 4,710,073 | 12/1987 | Peterson | 408/185 |
| 5,046,226 | 9/1991 | Che | 72/703 |
| 5,174,697 | 12/1992 | Ariyoshi | 408/147 |
| 5,330,297 | 7/1994 | Engstrand | 408/185 |

Primary Examiner—Joseph J. Hail, III
Assistant Examiner—Ed Tola
Attorney, Agent, or Firm—James L. Jackson, Esq.; Mayor, Day, Caldwell & Keeton, L.L.P.

[57] ABSTRACT

A modular knurling tool is provided having a tool shank defining a first dove-tail connector and having at least one adjustment drive recess. Any selected one of a number of different knurling heads are adjustably connected to the tool shank by a second dove-tail connector, such that with the tool shank mounted in the tool support of a metal working machine, the knurling head is linearly adjustable along an axis that is oriented in normal relation with the longitudinal axis of the tool shank and in normal relation with the axis of the rotating work piece. A threaded adjustment member is positioned with a circular thrust element thereof located in rotatable relation within the adjustment drive recess so that rotation of the threaded adjustment will impart linear adjustment movement to the knurling head relative to the tool shank. A locking mechanism is also provided for the first and second dove-tail connections to lock the knurling head in immovable relation with the tool shank after proper knurling head adjustment has been achieved.

11 Claims, 4 Drawing Sheets

MODULAR KNURLING TOOL

BACKGROUND OF THE INVENTION

1. FIELD OF THE INVENTION

This invention relates generally to knurling tools for use by rotary metal working machines such as automatic screw machines, lathes, CNC machines and the like. More particularly, the present invention is directed to modular knurling tools having a tool shank adapted for support by the tool support of a metal working machine and defining an adjustable connector to which any one of several types of knurling heads is releasably and adjustably connected and selectively and securely locked.

2. DESCRIPTION OF THE PRIOR ART

Typically, knurling tools have been provided having a tool body having a shank that is of a dimension for mounting by the tool holder assembly of a lathe, CNC or other type of metal working machine so that one or more knurling wheels, rotatably supported by the knurling tool body, can be positioned in forcible engagement with a rotatable workpiece to thus knurl or deform the outer surface of the workpiece and define a desired knurling pattern. Typically, the only component of the knurling tool that is replaceable is the knurling wheels. These knurling tools are usually designed to form only a single knurling pattern so that changing the knurling pattern requires replacement of the knurling wheel or wheels. If a different type of knurling pattern is desired it is often more practical, rather than replace the knurling wheels of a particular tool, to acquire a separate knurling tool with the desired wheel pattern. Many times work piece knurling activities require a knurling tool having two knurling wheels oriented in angular relation with one another so that the patterns of the knurling wheels will overlap on the work piece to provide a desired composite pattern. In such case it is often necessary to acquire a special knurling tool to produce this desired knurling pattern on work pieces. Because of these conventional knurling tool practices it is typical for machining organizations to eventually accumulate a large number of knurling tools, thus requiring significant machine tool capital investment and requiring significant tool crib organization and control activities for efficient operation of a machining business. All of these factors constitute impediments to the commercial success of work piece knurling operations by increasing the ultimate costs of machining operations.

Over the years a number of others have determined the feasibility of providing knurling tools that can be adjusted or converted so as to provide the capability for accomplishing a number of differing knurling tasks with a single adjustable knurling tool. Examples of such adjustable knurling tools and adjustable or convertible tools in general are represented by U.S. Pat. No. 1,492,814 of Sheberashenko; U.S. Pat. No. 2,436,950 of Boyer; U.S. Pat. No. 2,796,779 of Miller; U.S. Pat. No. 3,972,212of Brinkman and U.S. Pat. No. 5,046,226 of Che. The problem with most adjustable machine tools of this nature is the lack of stability or rigidity during machining operations, which compromises the quality of the machining operations that can be accomplished. For quality machining operations, including knurling operations, the machine tools must be absolutely immovable during machining operations, even when placed under heavy load or operated at high speed for high production. The adjusting mechanisms with which most of these types of machine tools are provided typically allow some tool movement, especially when the tools are being used under heavy load or at high speed. It is desirable therefore to provide a modular knurling tool having the capability for efficiently stabilized rotary support of single, dual or multiple knurling wheels so that the resulting knurling operation will be of high quality and high performance. Since set-up time is also a problem that interferes with the commercial feasibility of adjustable machine tools of any type, it is desirable to provide a modular knurling tool having a single tool shank that can be set up by the tool holder of a machine in the usual fashion. The mounted tool shank is adapted to receive any one of a number of knurling heads without necessitating its removal from the tool holder. This feature will allow knurling heads to be easily and simply interchanged as needed for variation in the character of knurling that is desired and will allow a machining facility to maintain a minimum number of tool shanks, thus also minimizing the overall machine tool inventory that is necessary for operation of the machining facility. It is also desirable to provide a modular knurling tool that, without disturbing the mounting of the tool shank in the tool holder of a metal working machine, can be simply and efficiently adjusted with respect to the work piece being knurled so that knurling operations can continue with a minimal of delay in the event adjustment becomes desirable.

When adjustable knurling tools are utilized they are typically of such bulky nature that work pieces cannot be knurled close to or against a square work piece shoulder. It is desirable to provide a modular knurling tool having a tool shank that is adapted to receive a knurling head having one or more outboard knurling wheels that are so located with respect to the tool head that cylindrical surfaces of work pieces intersecting abrupt shoulders can be provided with knurling.

One of the problems that typically plague high performance, high speed knurling operations is the high degree of wear that knurling wheels encounter as they are subjected to high speed knurling while heavy force is being applied, thus subjecting the knurling wheels to significant heat and significant thrust loads. It is also desirable to provide a modular knurling system which incorporates knurling wheels and knurling wheel support that will effectively accommodate the heavy thrust loads and resist heat buildup during high speed and high performance knurling operations.

SUMMARY OF THE INVENTION

It is a principal feature of the present invention to provide a novel modular knurling tool having a tool shank that is designed for mounting to the tool support of a metal working machine and having a connector to which any of a plurality of knurling heads may be selectively attached and adjustably positioned;

It is another feature of the present invention to provide a novel modular knurling tool having a tool shank defining a dove-tail connector permitting linearly adjustable interlocking connection of a knurling head thereto;

It is an even further feature of the present invention to provide a novel modular knurling tool having a tool shank and a tool head that are interconnected by interlocking dove-tail connections and having an adjustment mechanism for controllably moving the tool head linearly relative to the tool shank for simply, efficiently and accurately positioning the rolls of the knurling head relative to the rotating workpiece to form knurls on the workpiece;

It is also a feature of the present invention to provide a novel modular knurling tool having one or more knurling wheels that are replaceably mounted to a knurling head and which knurling wheels are rotatably supported to accommodate significant thrust loads and high speed operation while at the same time minimizing stress on the metal working machine by the knurling operation;

It is also a feature of the present invention to provide a novel modular knurling tool that is of compact design and facilitates utilization of a knurling head having the capability for knurling cylindrical surfaces against abrupt shoulders;

It is another significant feature of the present invention to provide a novel modular knurling tool that permits replacement and adjustment of knurling heads without necessitating removal of the knurling tool shank from the tool mount of the metal working machine; and It is an even further feature of the present invention to provide a novel modular knurling tool of sufficiently compact and sturdy design as to permit the use of a knurling head having one or more small diameter knurling wheels for the purpose of forming knurled surfaces on work pieces of small diameter.

Briefly, the various objects and features of the present invention, including those that become obvious and inherent from the following detailed description, are realized by providing a tool shank having a first dove-tail connector and defining at least one adjustment drive recess. Any one of a number of different knurling heads are adjustably connected to the tool shank by a second dove-tail connector, such that with the tool shank mounted in the tool support of a metal working machine, the knurling head is linearly adjustable along an axis that is oriented in substantially normal relation with the longitudinal axis of the tool shank and in substantially normal relation with the axis of the rotating work piece. A threaded adjustment member is positioned with a circular thrust member thereof located in rotatable relation within the adjustment drive recess so that rotation of the threaded adjustment will impart linear adjustment movement to the knurling head. A locking mechanism is also provided for the first and second dove-tail connections to lock the knurling head in immovable relation with the tool shank after proper knurling head adjustment has been achieved.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings:

FIG. 1 is an isometric illustration showing a knurling head having two angulated knurl rolls being interconnected with the tool shank and showing the knurling head being adjusted downwardly to its maximum extent relative to the tool shank;

FIG. 2 is an isometric illustration showing the tool shank and knurling head assembly of FIG. 1 and showing the knurling head being adjusted upwardly to its maximum extent relative to the tool shank;

FIG. 3 is a plan view of the tool shank of FIGS. 1 and 2;

FIG. 4 is a side elevational view of the tool shank of FIGS. 1 and 2, having parts thereof broken away and shown in section;

FIG. 5 is a front elevational view of the knurling head of FIGS. 1 and 2 with the knurl rolls removed and, by way of broken line, showing the knurl axle bores;

FIG. 6 is a side elevational view of the knurling head of FIGS. 1 and 2 with the knurl rolls removed and having parts thereof broken away and showing the dove-tail connector thereof in detail;

FIG. 7 is a rear elevational view of the knurling head of FIG. 6, showing the dove-tail connector thereof in detail;

FIG. 8 is a top elevational view of the tool head of FIGS. 5–7 with parts thereof broken away and shown in section and showing the dove-tail connector of the tool shank of FIGS. 3–5 and the tool head adjustment screw in assembly therewith; and FIG. 9 is an elevational view showing the tool head adjustment screw in detail; and FIG. 10 is an end view showing the tool head adjustment screw of FIG. 9.

FIG. 11 is a side elevational view of a tool head representing an alternative embodiment as compared with the tool head of FIGS. 5–8;

FIG. 12 is a front elevational view of the tool head of FIG. 11; and

FIG. 13 is a plan view of the tool head of FIGS. 11 and 12.

DETAILED DESCRIPTION OF PREFERRED EMBODIMENT

Figure 1:
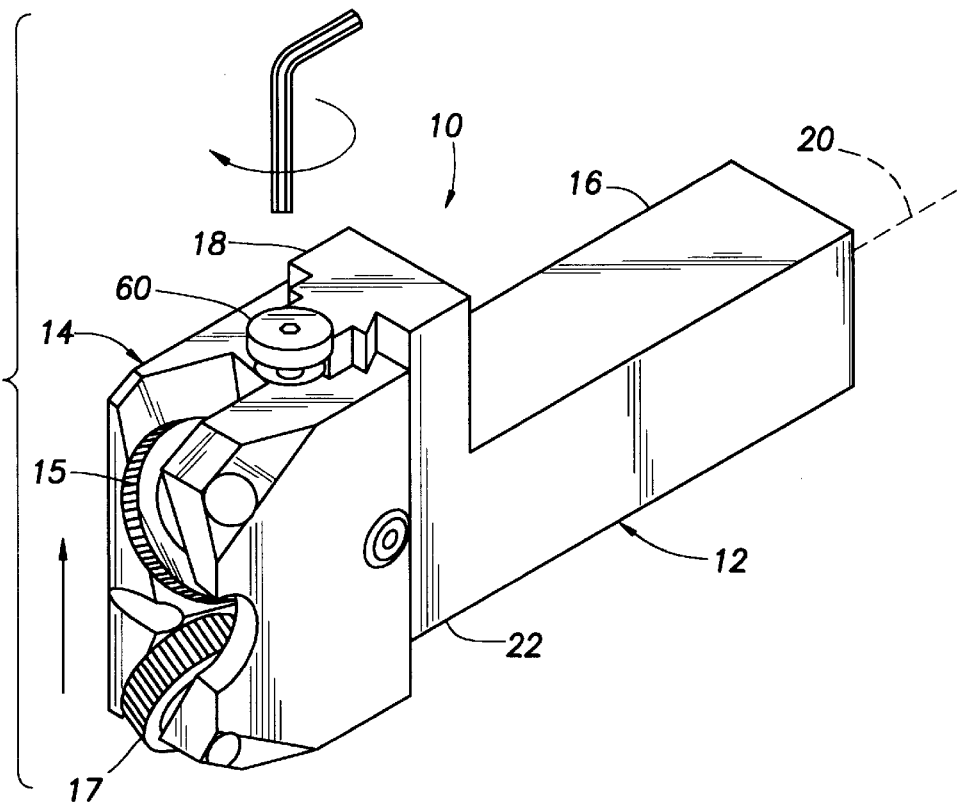
Figure 2:
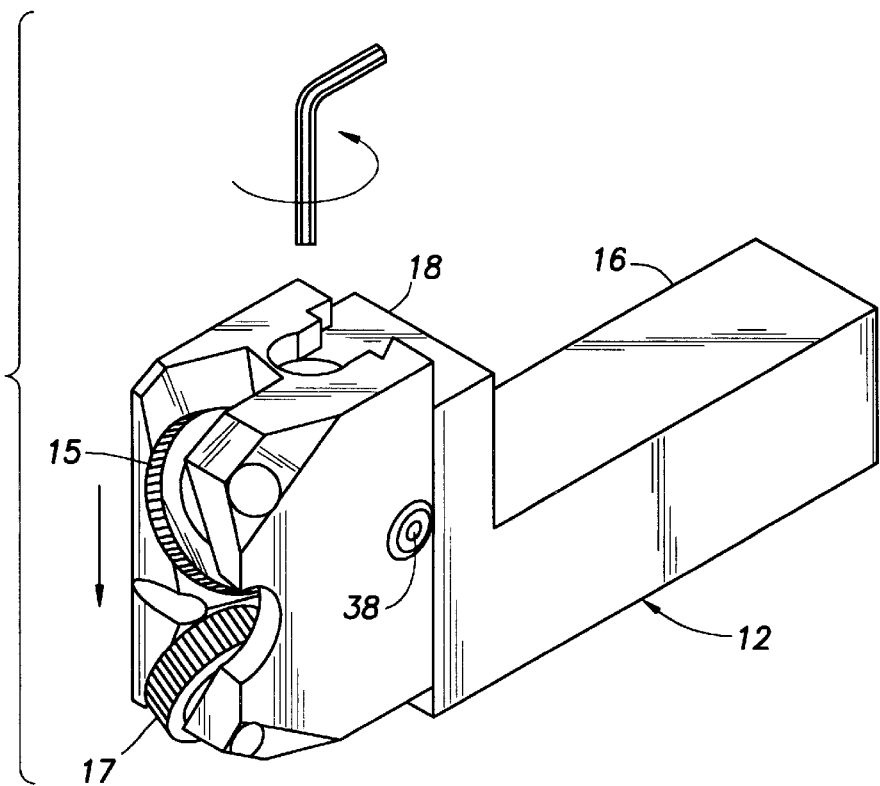
Figure 3:
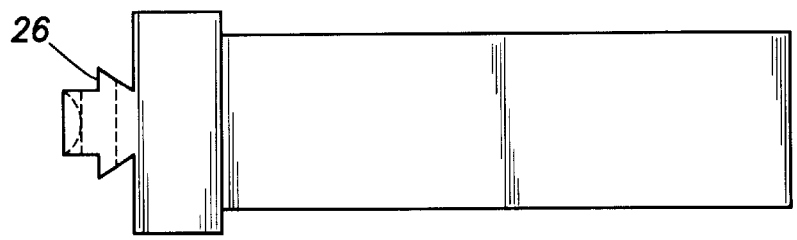

Referring now to the drawings and first to FIGS. 1 and 2, a modular knurling tool embodying the principles of the present invention is shown generally at 10 and incorporates a tool shank shown generally at 12 and a tool head shown generally at 14. The tool shank 12 defines an elongate, generally rectangular elongate mounting bar 16 having a cross-sectional configuration for fitting within the tool mount of a metal working machine, not shown. At one of its ends the tool shank defines a mounting head 18 which is oriented in substantially normal relation with the longitudinal axis 20 of the elongate mounting bar 16. The lower end 22 of the mounting head 18 may be located in coextensive relation with the bottom surface 24 of the mounting bar 16 as shown in FIGS. 1 and 2, or it may extend beyond the bottom surface 24 of the mounting bar 16 as shown in FIGS. 3–5 hereof.

The mounting head 18 defines a first connector 26 in the form of an elongate dove-tail connector which extends substantially the entire length of the mounting head and which, with the tool shank supported by a metal working machine, is oriented in normal relation with the axis of rotation of the work piece being rotated by the machine. Typically, the mounting head will be mounted with the dove-tail connector oriented vertically, but it may have any desired orientation as long as its orientation is in normal relation with the axis of rotation of the work piece. The mounting head is also provided with an elongate adjustment and guide projection 28 which is of generally rectangular cross-sectional configuration and which extends substantially the entire length of the mounting head as is evident from FIG. 4. Preferably the elongate adjustment and guide projection 28 is integral with the mounting head, but it may be a separate element supported by the mounting head if desired.

Figure 4:
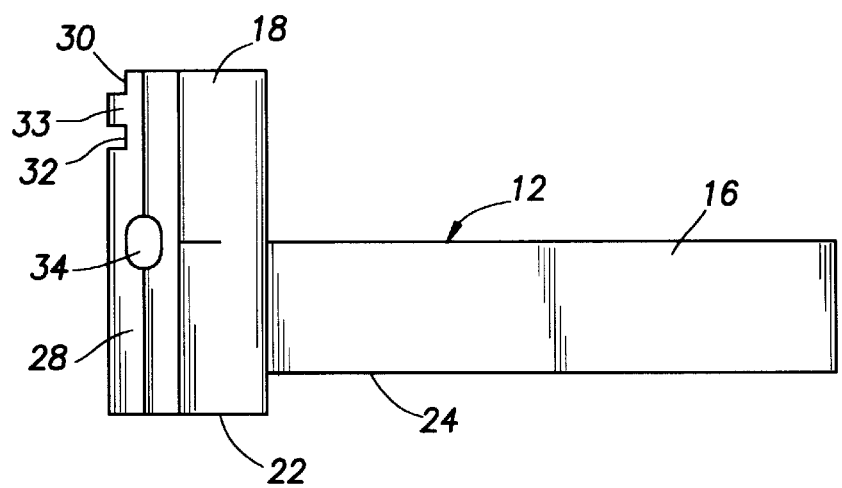
Figure 5:
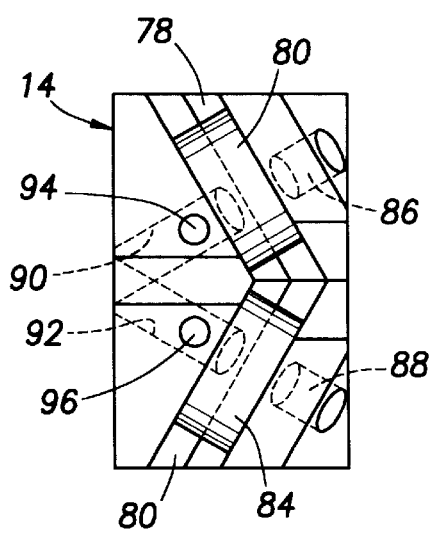
Figure 6:
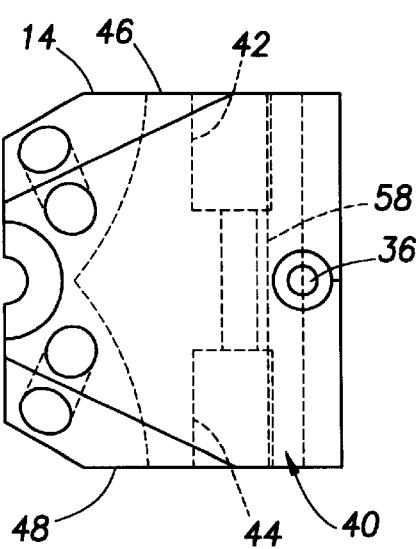
Figure 7:
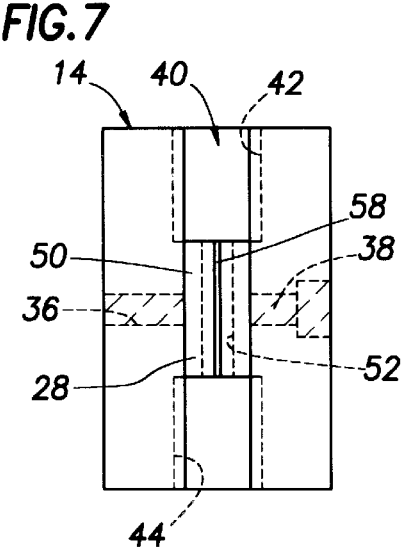
Figure 9:
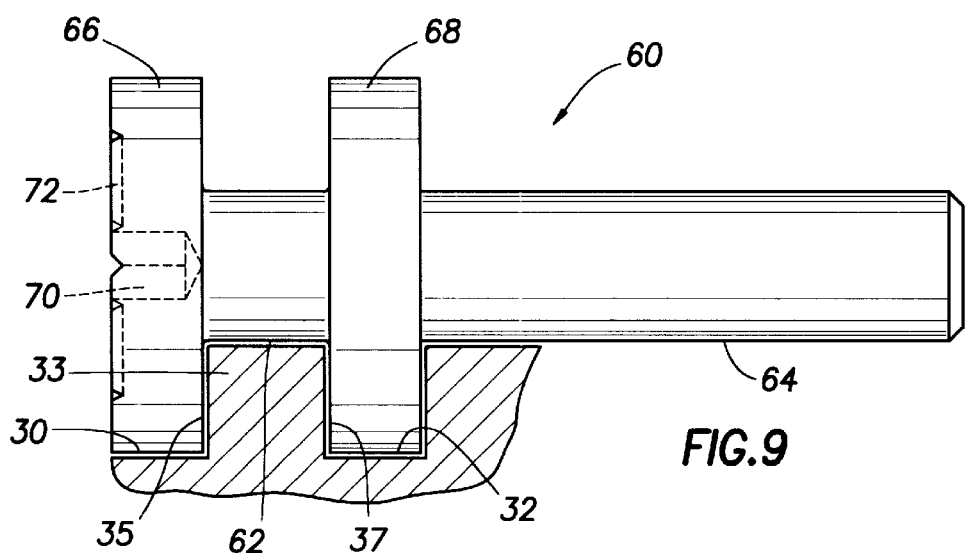

As shown in FIGS. 4 and 9, at one of its ends the elongate adjustment and guide projection 28 defines a pair of spaced arcuate adjustment slots 30 and 32 so that an abutment section 33 of the adjustment and guide projection is located between the adjustment slots functions as a force transmitting and receiving abutment member. The abutment member 33 defines oppositely facing shoulder surfaces 35 and 37 that are disposed for force receiving contact by a tool head adjustment element 60 to be described in detail hereinbelow. Arcuate adjustment slot 30 is exposed at one end of the elongate adjustment and guide projection 28 as shown by FIGS. 3 and 4. If reversible mounting of the tool head is desired with respect to the mounting head of the tool shank, arcuate adjustment slots may be provided at each end of the mounting head. Alternatively, and preferably, the tool head is designed so that it may be reversibly positioned in assembly with the mounting head of the tool shank to thus provide the knurling tool with flexibility in its manner of use. At the juncture of the dove-tail connector 26 and the elongate adjustment and guide projection 28 a transverse bore 34 is defined which is located intermediate the length of the adjustment head 18. The transverse bore 34 is of oval cross-sectional configuration for ease of registry with a transverse threaded locking bore 36 of the tool head which is best seen in FIGS. 6 and 7. The oval configuration of the transverse bore 34 and its orientation in alignment with orientation of the elongate adjustment and guide projection 28 permits linear movement of the tool head 14 relative to the mounting head 18 of the tool shank with the locking screw 38 in place. Thus, the length of linear adjustment movement of the adjustment head relative to the mounting head of the tool shank is limited only by the length of the oval transverse bore 34 and the dimension of the locking screw 38.

Figure 8:
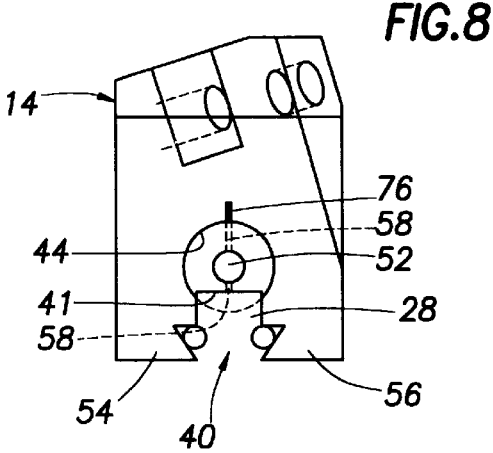

As shown particularly in FIGS. 5–8, the mounting head 14 defines a second connector shown generally at 40 and being in the form of an internal dove-tail slot extending substantially the entire length of the tool head. The second connector also defines an internal elongate guide receptacle 41 of generally rectangular cross-sectional configuration for receiving the elongate adjustment and guide projection 28 of the mounting head 18 in guiding relation therein as shown in FIG. 8. The reversible character of the tool head relative to the mounting head is defined in part by a pair of blind adjustment bores 42 and 44 that open respectively from the top 46 and bottom 48 of the tool head 14. Between the blind adjustment bores 42 and 44 a web structure 50 of the tool head is provided with an internally threaded adjustment bore 52 which is axially centered with respect to each of the blind adjustment bores 42 and 44. The internal dove-tail slot and the elongate internal adjustment and guide receptacle 41 separate the tool head in a manner defining opposed, substantially identical bifurcations or flanges 54 and 56. As the locking screw 38, extending through these bifurcations or flanges, is tightened to secure the tool head in immovable, locked relation with respect to the mounting head of the tool shank, it is desirable that the bifurcations or flanges be yieldable toward one another so as to take up the slight clearance of the internal side surfaces of the dove-tail slot and guide receptacle and establish frictional locking engagement with respective side surfaces of the dove-tail connector and the elongate adjustment and guide projection 28 of the mounting head 18. To enhance the flexibility of the bifuircations or flanges 54 and 56 the central web structure 50 is provided with a longitudinal slot 58 that intersects the internally threaded adjustment bore 52 and extends beyond the threaded adjustment bore as is evident from FIGS. 7, 8 and 13. This longitudinal slot, together with the internal dove-tail slot and the adjustment and guide receptacle permit sufficient yielding of the bifurcations or flanges 54 and 56 by the force of tightening the locking screw 38 that frictional locking of the tool head to the mounting head of the tool shank is readily established.

Figure 10:
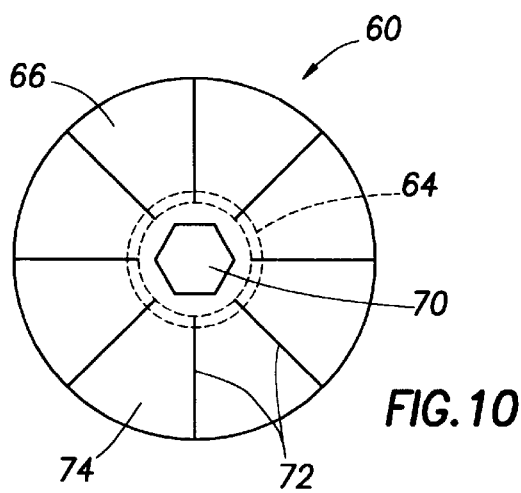

For linear adjustment of the tool head relative to the mounting head of the tool shank, it is necessary to provide a mechanism having movable linear force transmitting relation with the tool head and force transmitting relation with the mounting head of the tool shank. Within the scope of the present invention this feature is achieved by an adjustment screw shown generally at 60 in FIGS. 9 and 10 having a screw shaft 62 defining a threaded shaft section 64 that is received in threaded engagement within the internally threaded adjustment bore 52 of the tool head 14. Thus, as the adjustment screw 60 is rotated, its threaded connection within the internally threaded adjustment bore 52 develops a linear force on the tool head. The adjustment screw 60 defines circular force transmitting flanges 66 and 68 that are located in spaced relation along the length of the adjustment screw and which are received by a selected one of the blind bores 42 or 44 of the tool head. The spaced circular force transmitting flanges 66 and 68 are also received respectively with the arcuate adjustment slots 30 and 32 of the elongate adjustment and guide projection 28 of the first connector 26 of the tool shank 12. When the spaced circular force transmitting flanges 66 and 68 are positioned within their respective arcuate adjustment slots, the force transmitting and receiving abutment member defined by the section 33 of the elongate adjustment and guide projection 28 is located between the force transmitting flanges 66 and 68 of the adjustment screw and thus prevents the adjustment screw from linear movement as the screw is rotated within the internally threaded bore 52. Thus, as the adjustment screw is rotated, and since the adjustment screw cannot move linearly relative to the abutment section 33 and the elongate guide projection 28, the tool head is driven linearly for adjusting the position of the tool head relative to the tool shank and thus also adjusting the position of the knurl rolls of the tool head with respect to the work piece being rotated by the metal working machine. Adjustment of the tool head in either linear direction is thus achieved by selective rotation of the adjustment screw, assuming of course that the locking screw 38 has been loosened to release frictional locking of the tool head with respect to the mounting head of the tool shank.

The adjustment screw 60, like the locking screw 38, is preferably provided with an Allen drive receptacle 70 that receives an Allen wrench of proper dimension to permit the screw to be manually rotated. It should be borne in mind however, that the adjustment screw and the locking screw may be provided with any other type of drive receptacle without departing from the spirit and scope of the present invention. Additionally, the outer circular flange 66 defines angulated indicia which may be in the form of lines that are oriented at 45degrees with respect to one another as shown or which may have any other suitable angular orientation as desired. The indicia lines 72 may be etched onto the end surface 74 of the outer flange 66 or may be in the form of grooves machined or otherwise formed in the outer flange. When the adjustment screw is seated within the arcuate slots 30 and 32 of the mounting head 18 the indicia lines are registerable with orienting reference indicia 76 that is present at the respective top and bottom surfaces 46 and 48 of the tool head as best shown in FIG. 8. The orienting reference indicia 76 may be defined by etched lines or marks or may be defined by grooves or depressions that are machined or otherwise formed in the metal structure of the tool head.

Figure 11:
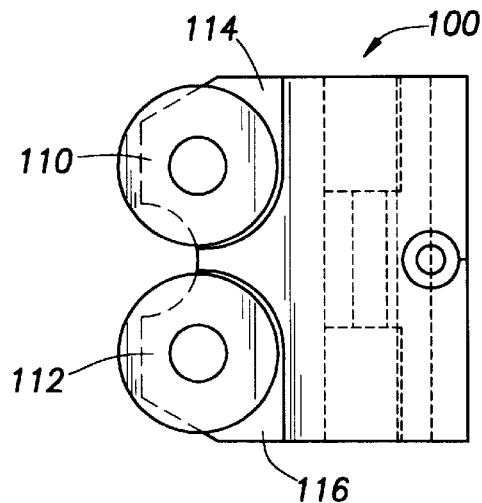
Figure 12:
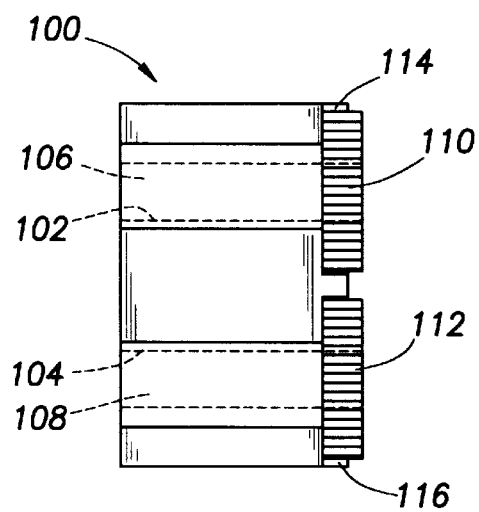
Figure 13:
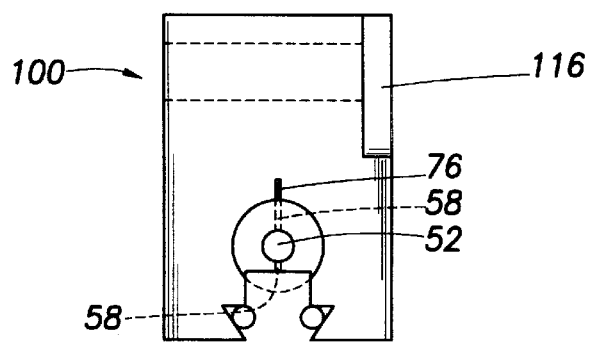

As shown in FIGS. 1, 2 and 5–8, the modular knurling tool 10 is shown to be provided with knurling head 14 having a pair of knurling rolls or wheels 15 and 17 that are oriented in inclined and angulated relation with respect to the tool head and thus with respect to the work piece to be knurled during rotation thereof by the metal working machine. The knurling wheels are rotatably supported by respective axles 19 and 21 and have thrust washers 23 and 25 on opposite sides of each knurling wheel to provide the knurling tool with the capability of efficient operation under heavy thrust loads with minimal stress on the metal working machine and with minimum heat build-up during high speed knurling operations. It should be borne in mind that the present invention permits the tool shank 12 to be provided with any of a number of different types of tool heads and permits the tool heads to be interchanged while the tool shank is securely mounted by the metal working machine. For example, FIGS. 11–13 show a knurling tool head that is designed for supporting knurl rolls with the axes of rotation thereof disposed in parallel relation and with the knurl rolls positioned for knurling a cylindrical section of a work piece to an abrupt work piece shoulder. The tool head mounting system thereof, however, is substantially identical with the tool head mounting system of the modular knurling tool that is depicted in FIGS. 1–10. This feature effectively promotes selective mounting of any one of a number of different types of knurling heads in assembly with a single tool shank and permits knurling heads to be interchanged without removing the tool shank from the tool mount of the machine and to be adjusted with the tool shank supported by the tool mount of the metal working machine.

Referring now to FIGS. 5–8, the tool head 14 is machined or otherwise formed to define a pair of roll slots 78 and 80 that are disposed in angulated relation with one another and inclined with respect to the vertical. These roll slots are determined by the dimension of the work piece to be knurled and the character of knurling to be formed on the work piece. Angulation of the roll slots causes knurl rolls 82 and 84 thereof to form diamond configured knurling on the work piece. The character of the resulting knurling of the work piece is also defined by the configuration of the ridges and grooves that are defined by the cylindrical external cutting surface of the knurl rolls. The knurl rolls are each rotatably mounted by mounting pins 86 and 88 that are received within mounting bores 90 and 92 that are formed in the tool head and are oriented to rotatably support the knurl rolls for desired orientation. The roll mounting pins 86 and 88 are locked against movement relative to the mounting head by a pair of set screws 94 and 96.

Referring to FIGS. 11–13, an alternative tool head is shown generally at 100 having parallel roll pin mounting bores 102 and 104 having roll pins 106 and 108 therein for supporting knurl rolls 110 and 112 with the axes of rotation there oriented in parallel relation. The tool head 100 also defines knurl receptacles 114 and 116 that are located at a side of the tool head so that the knurl rolls 110 and 112 are supported in such manner that side portions thereof project beyond respective side surface of the tool head and thus permit knurling a cylindrical surface of a work piece to its intersection with an abrupt shoulder of the workpiece. The dove-tail connection structure of the tool head 100 is substantially identical to that of the tool head 14 of FIGS. 1–10 so that the tool head 100 is interchangeable with the tool head 14 simply by unlocking the tool head from the tool shank, removing the locking screw 38, completely unthreading the adjustment screw from the threaded bore 52 and then moving the tool head linearly until the dove-tail connection becomes released.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

What is claimed is:

1. A modular knurling tool for metal working machines adapted for rotating workpieces during machining operations, said modular knurling tool comprising:
   (a) a tool shank adapted to be received in supported relation by the tool support of a metal working machine and defining a longitudinal axis and having a dove-tail connector projection defining a pair of spaced arcuate slots and an abutment section located between said arcuate slots;
   (b) a tool head defining an internal dove-tail slot connector having spaced flexible locking flanges and being in releasable and linearly adjustable interlocking relation with said first connector;
   (c) at least one knurling wheel being rotatably supported by said tool head and defining external knurls of a desired configuration for forming knurling on a rotating workpiece, said at least one knurling wheel being supported in desired orientation with the rotating workpiece to form desired knurling thereon; and
   (d) a rotary adjustment member having threaded engagement with said tool head and having a pair of spaced thrust force transmitting flanges thereon, said thrust force transmitting flanges being located for rotation within said arcuate slots and having thrust force transmitting engagement with said abutment section of said tool shank and being rotatable for linear adjustment of said tool head in a direction substantially normal with said longitudinal axis of said tool shank.

2. The modular knurling tool of claim 1, wherein:
   (a) said tool head defining an internally threaded section threadedly receiving said threaded adjustment member and having a slot extending through said internally threaded section and into said tool head, said tool head further defining a transverse locking bore having internal locking threads therein; and
   (b) a locking screw being received by said transverse locking bore and having threaded engagement with said locking threads thereof and being positionable for closing said slot and establishing frictional locking of said locking screw by said locking threads for securing said tool head in immovable relation with said tool shank at any selected position of said tool head relative to said tool shank.

3. The modular knurling tool of claim 1, wherein: said dove-tail projection and dove-tail slot permitting linear movement of said tool head relative to said tool shank in a direction substantially normal to said longitudinal axis.

4. The modular knurling tool of claim 1, wherein:
   (a) said tool head having at least one knurling wheel positioned for knurling contact with a work piece being rotatably mounted by said metal working machine;

(b) at least one axle being fixed to said tool head and rotatably supporting said knurling wheel on said tool head; and (c) thrust washers being received by said axle and being located on each side of said knurling wheel, said thrust washers minimizing thrust force interference with knurling wheel rotation due to thrust loads.

5. The modular knurling tool of claim 1, wherein:

(a) said tool head defining a pair of spaced flexible flanges; and (b) a locking screw engaging said flexible flanges and adapted upon locking movement thereof for flexing said flexible flanges toward one another and establishing frictional locking retention of said dove-tail projection and internal dove-tail slot connectors in immovable relation for retention of said tool head in immovable relation with said mounting head, upon unlocking movement of said locking screw said flexible flanges returning to the original geometric configuration thereof and permitting adjustment movement of said tool head relative to said mounting head.

6. The modular knurling tool of claim 1, wherein:

(a) said tool head defining first and second spaced flexible locking flanges; and (b) said locking element being a locking screw having threaded engagement with said first flexible locking flange and having a screw head having force transmitting engagement with said second flexible locking flange.

7. A modular knurling tool for metal working machines adapted for rotating workpieces during machining operations, said modular knurling tool comprising:

(a) a tool shank adapted to be received in supported relation by the tool support of a metal working machine and defining a longitudinal axis;

(b) a mounting head being fixed to said tool shank and defining a dove-tail projection connector;

(c) a tool head defining an internal second dove-tail slot connector being in releasable and linearly adjustable interlocking relation with said dove-tail projection connector, said dove-tail projection connector and said dove-tail slot connector being oriented for linear adjustment movement of said tool head in a direction being substantially normal to said longitudinal axis;

(d) at least one knurling wheel being rotatably supported by said tool head and defining external knurls of a desired configuration for forming knurling on a rotating workpiece, said at least one knurling wheel being supported in desired orientation with the rotating workpiece to form desired knurling thereon;

(e) a rotary adjustment screw having threaded engagement with said tool head and having a pair of spaced flanges received in thrust force transmitting engagement within said spaced arcuate slots of said mounting head of said tool shank being rotatable for linear adjustment of said tool head in a direction substantially normal with said longitudinal axis of said tool shank; and (f) lock means for securing said tool head in immovable relation with said tool shank at any selected position of said tool head relative to said tool shank and being positionable for releasing said tool head for linear movement relative to said mounting head.

8. The modular knurling tool of claim 7, wherein:

(a) said tool head defining first and second spaced flexible flanges having said dove-tail slot connector therebetween said flexible flanges being yieldable toward one another by locking force and returning to the original geometric configuration thereof up dissipation of said locking force; and (b) a locking screw adapted upon locking movement thereof for applying a locking force to said flexible flanges for flexing said flexible flanges toward one another and thus closing said flexible flanges relative to said dove-tail projection connector and establishing frictional locking retention of said dove-tail projection connector and said dove-tail slot connector in immovable relation for retention of said tool head in immovable relation with said mounting head, upon unlocking movement of said locking element said flexible flanges returning to the original geometric configuration thereof and permitting adjustment movement of said tool head relative to said mounting head.

9. The modular knurling tool of claim 8, wherein:

said locking screw having threaded engagement with said first flexible flange and having a screw head having locking force transmitting engagement with said second flexible flange.

10. The modular knurling tool of claim 7, wherein:

(a) said tool head defining a threaded bore;

(b) an abutment section being defined by said tool shank; and (c) said adjustment screw having threaded engagement with said threaded bore and having at least one force transmitting flange positioned for imparting a tool head moving force to said abutment section upon rotation of said adjustment screw.

11. The modular knurling tool of claim 7, wherein:

(a) said tool head defining a threaded bore;

(b) an abutment being defined by said tool shank and having oppositely facing abutment shoulders; and (c) said adjustment screw having threaded engagement with said threaded bore and having a pair of spaced circular drive heads positioned for force transmitting engagement with said oppositely facing abutment shoulders for imparting a tool head moving force to said abutment section upon rotation of said adjustment screw.

* * * * *